US008577688B2

(12) United States Patent
Caswell et al.

(10) Patent No.: US 8,577,688 B2
(45) Date of Patent: Nov. 5, 2013

(54) ALLIANCE BUSINESS RELATIONSHIP MANAGEMENT METHOD AND TOOL

(75) Inventors: Nathan Sauders Caswell, Yorktown Heights, NY (US); Gina M. Comer, New Orleans, LA (US); Michael A. Limanni, Jr., Bonney Lake, WA (US)

(73) Assignee: International Business Machines Corporation, Armonk, NY (US)

( * ) Notice: Subject to any disclaimer, the term of this patent is extended or adjusted under 35 U.S.C. 154(b) by 2193 days.

(21) Appl. No.: 11/152,972

(22) Filed: Jun. 14, 2005

(65) Prior Publication Data
US 2006/0282273 A1    Dec. 14, 2006

(51) Int. Cl.
*G06Q 10/00*   (2012.01)
(52) U.S. Cl.
USPC .......................................................... 705/1.1
(58) Field of Classification Search
USPC .............................................................. 705/1
See application file for complete search history.

(56) References Cited

U.S. PATENT DOCUMENTS

| | | | |
|---|---|---|---|
| 6,721,713 B1 | 4/2004 | Guheen et al. | |
| 7,149,698 B2 * | 12/2006 | Guheen et al. | 705/1 |
| 2003/0023533 A1 * | 1/2003 | Tan | 705/36 |
| 2004/0073474 A1 | 4/2004 | Field et al. | |
| 2004/0102982 A1 * | 5/2004 | Reid et al. | 705/1 |
| 2006/0190457 A1 * | 8/2006 | Chien | 707/10 |

OTHER PUBLICATIONS

BusinessDictionary.com: definition for "evaluation" <http://www.businessdictionary.com/definition/evaluation.html>.*
Merriam-Webster Online Dictionary: definition for "evaluate" <http://www.merriam-webster.com/netdict/evaluation>.*

* cited by examiner

*Primary Examiner* — Jami A Plucinski
*Assistant Examiner* — Shaun Sensenig
(74) *Attorney, Agent, or Firm* — John Pivnichny

(57) ABSTRACT

An alliance business relationship is managed by receiving a request for a relationship from a firm. An alliance taxonomy stored in a database is used to determine whether the request is an alliance. An opportunity in the request is identified and quantified. The alliance is formed, executed, and subsequently terminated. Thereafter, the alliance is again evaluated against the criteria in the taxonomy to determine whether another relationship type applies.

18 Claims, 2 Drawing Sheets

ALLIANCE BUSINESS RELATIONSHIP MANAGEMENT METHOD AND TOOL

TECHNICAL FIELD

The invention relates generally to methods and tools for third party business relationships. More particularly, the invention relates to business processes for managing relationships involving business alliances or other strategic relationships with external companies. Even more particularly, the invention relates to automation of these business processes.

BACKGROUND OF THE INVENTION

Strategic relationships including business alliances have become an important type of relationship between independent businesses for jointly providing solutions to customer's needs. Several patents and patent applications describe inventions for addressing business alliances. For example, Guheen et al. in U.S. Pat. No. 6,721,713 describe identifying alliances among a plurality of business entities in terms of a current network framework. The network framework is a web architecture framework. In one embodiment, Guheen gives a pictorial representation to convey various services which would be provided in a business offering.

Tan, in US Patent Application 2003/0023533 describes a method and system for simulating and managing an alliance investment portfolio. Apparently, the challenges in corporate finance management for alliances deal with achieving an optimal capital structure that can facilitate the needs of growth industries while also creating investor interest through containment of risk and achievement of a return matching the risk undertaken. Tan's method addresses managing a portfolio of assets including alliance investments.

Field et al in US Patent Application 2004/0073474 describe a method for creating a multi-level business alliance in non-exclusive geographical areas. Field's multi-level alliance includes a founding firm creating an alliance with one or more foundation firms. The foundation firms pay a fee to the founding firm. The foundation firms and the founding firm share resources and clients, and they also share revenue based on a formula. The founding firm or each foundation firm may sign up a second level firm to the alliance. The licensing fees paid by a second level firm is shared by the founding firm and the foundation firm signing the second level firm based on a formula.

Each second level firm may sign up a third level firm. The signing second level firm, the parent foundation firm that introduces the signing second level firm to the alliance, and the founding firm all share the licensing fee paid by the third level firm according to a formula. By creating such multi-level alliances, multiple firms work together to provide a broader range of services to each other's clients while remaining independent of each other.

The patents and patent applications described above by Guheen, Tan, and Field are all incorporated by reference herein in their entireties.

Despite the aforementioned developments, there remains a great need for methods of managing the many alliance and other strategic relationships which are being created today. It is believed that the present invention described below providing such a method constitute a significant advancement in the art of managing business relationships.

OBJECTS AND SUMMARY OF THE INVENTION

It is therefore a principal object of the present invention to enhance the art of managing business relationships by providing a method for performing such management with enhanced alliance management capabilities.

It is another object to provide such a method wherein enhanced operational capabilities are possible. The enhancements will facilitate, for example, formation, management, and dissolution of business relationships.

It is further object to provide a database system for performing such managing.

It is a further object to provide a software tool for managing such business relationships.

It is yet another object of the invention to provide a program product for improved managing of business alliance relationships.

It is another object to provide a method of deploying such a management system to a services customer.

These and other objects are attained in accordance with one embodiment of the invention wherein there is provided a method of managing an alliance business relationship, comprising the steps of, receiving a request for a third party relationship, determining whether the relationship is an alliance using criteria in an alliance taxonomy, identifying and quantifying an opportunity in the relationship request, forming the alliance including negotiating an alliance relationship contract, executing the alliance, terminating the alliance, and evaluating the alliance against criteria in the alliance taxonomy.

In accordance with another embodiment of the invention there is provided an alliance managing system, comprising, an entry tool for receiving a request for a third party relationship, a database tool for determining whether the relationship is an alliance using criteria in an alliance taxonomy stored in the database tool, means for identifying and quantifying an opportunity in the relationship request, means for forming the alliance including negotiating an alliance relationship contract, and for tracking the forming and negotiating in the database tool, means for executing the alliance, means for terminating the alliance, and means for evaluating within the database tool, the alliance against criteria in the alliance taxonomy.

BEST MODE FOR CARRYING OUT THE INVENTION

For a better understanding of the present invention, together with other and further objects, advantages and capabilities thereof, reference is made to the following disclosure and the appended claims in connection with the above-described drawings.

The present invention includes a method system, program product, and deploying method for managing an alliance or strategic business relationship between two or more independent businesses, companies, or firms. One firm may have identified that their capabilities would combine well with or complement the capabilities of a second firm to provide value in the marketplace. The combination may meet the criteria for an alliance as specified in an alliance taxonomy. Either firm may have created and possess such a taxonomy.

Figure 1:
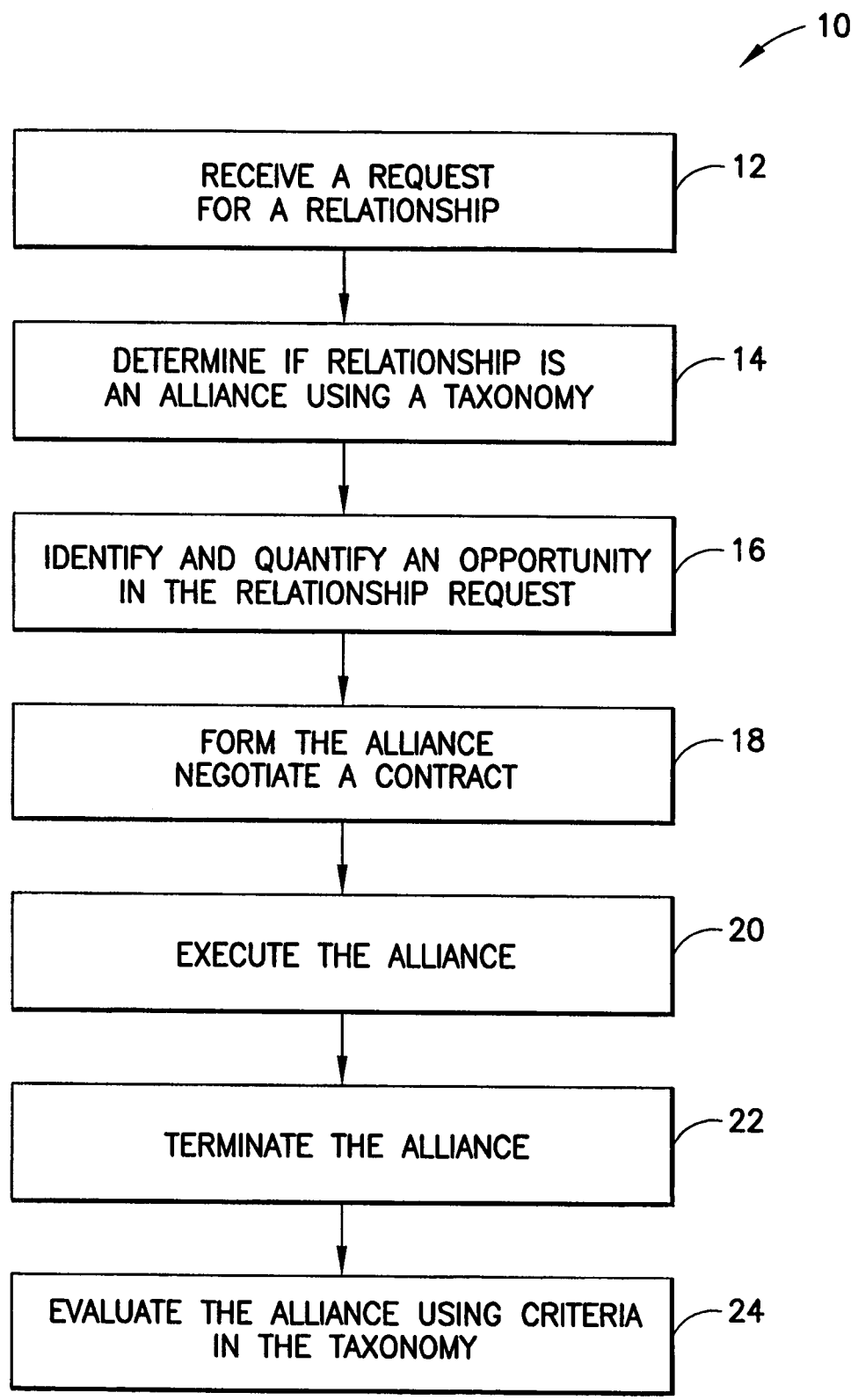
FIG. 1 is a flowchart of steps performed in accordance with the present invention.

With reference to the flowchart 10 of FIG. 1, a second firm may receive in step 12 a request from a first firm for a relationship. The request may be received in any manner such as a written proposal, a presentation, verbally whether in person or via telephone, e-mail, instant messaging, through use of a software or database tool, or any other manner known in the art. The request may be entered into a database tool, if not already received in such a manner, in step 12 by the second firm.

It may also occur to the second firm that a relationship with the first firm is desirable, without first receiving a request from the first firm. In that case, the second firm self generates a request for a relationship with the first firm and enters the self-generated request into the database tool in step 12. The request is entered in the same manner, whether actually received from the first firm or whether received as a self-generated request.

The second firm has a defined relationship taxonomy. In step 14, the second firm determines whether the requested relationship is an alliance by using this relationship taxonomy. The database tool may assist in making this determination through comparison and other operations known in the database arts between the request and various data elements in the taxonomy.

Figure 2:
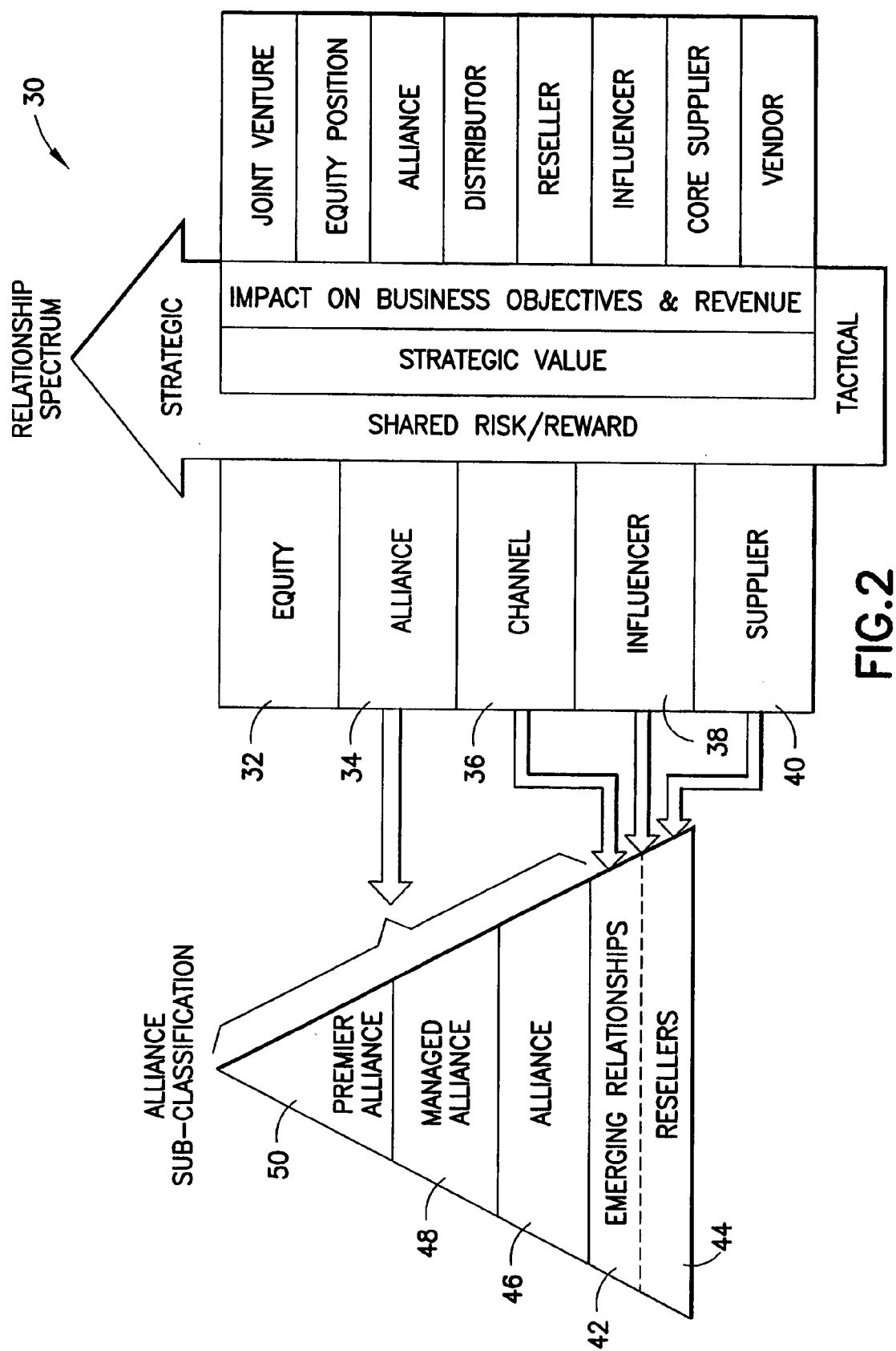
FIG. 2 is a geographical depiction of elements of a relationship taxonomy.

Turning to FIG. 2, there is shown various relationship types in a business relationship taxonomy 30. Relationship types of supplier 40, influencer 38, channel 36, alliance 34, and equity 32 are arranged in ascending order on a tactical to strategic spectrum of relationships. Proceeding from the tactical to strategic direction, FIG. 2 denotes that the share risk/reward, strategic value, and impact on business objectives and revenue all increase.

In a supplier relationship 40, one firm contracts to purchase products or services from another through a vendor, subcontractor or similar agreement to procure. A purchasing organization in one firm may exercise a significant amount of control over the methods utilized by the second firm, and the results. Supplier relationships can be used to create a competitive advantage, increase speed to market, improve quality and ensure supply continuity for the purchasing firm. As seen in FIG. 2, a supplier relationship 40 may be formed with a core supplier or with any other vendor.

A supplier relationship 40 may also be a critical component of an alliance. For example, the firms may agree that one will act as a "prime" and the second act as a "subcontractor" when the firms provide a joint solution to any potential customer of the alliance. Similarly, one firm may engage with a customer by acting as a reseller of the alliance partner's product or services.

In an influencer relationship 38, one firm provides incentives or benefits such as marketing, technical support, education, or financing to a third party in exchange for promotion of the first firm in the marketplace, but where the third party is not a channel (as defined below). Such promotion typically manifests itself in the form of leads. In the information technology (IT) arts, typical influencers will be application service providers, web hosters, Internet service providers, web integrators, systems integrators, software developers, and IT consulting firms.

Channel relationships 36 allow the flow of one firm's products or services through another, customer facing firm. Typically, that channel represents to a customer a package of complementary products and services comprising some or all of the other firm's portfolio of offerings. Channels are firms who may operate as resellers, value added resellers, or distributors. Contractual agreements with channels do not typically include control over the methods utilized by the channel, but in some instances there are terms and conditions which may effect some measure of control in the marketing or maintenance programs.

An alliance relationship 34 with a second firm external to a first firm allows the first to increase the value and capabilities it creates for its customers by increasing its available skills competencies, market reach or technology. An alliance relationship 34 ultimately increases the first firm's revenue, lowers its costs, or impacts market presence. An alliance must involve some degree of shared control of the operations, strategy, and risk/reward, often including joint participation in funding allocation and priorities. An alliance, therefore, requires ongoing and active management by both firms in all aspects of the relationship. The remedy for failure to achieve joint alliance objectives is typically the dissolution or restructuring of the alliance rather than financial or legal damages. An alliance is not a legal entity, like a corporation or a partnership, nor does one firm have an equity interest in the other. An alliance is based on a linkage of complementary capabilities between the firms, but is not fundamentally a mere supplier 40 or channel 36 relationship. The objective of an alliance is the need to routinely gain access to markets, assets such as technology, or people or to avoid cost. An alliance relationship cannot be established merely by application to a program or web system.

Alliance relationships are typically complex, and can be used to accommodate a very large number of different and flexible business models including "sell with," "sell through," "sell to," "joint marketing," "lead passing," and "joint development." An alliance contracting model therefore typically includes an umbrella or general relationship document which describes the overall nature of the firms' relationships, sets forth obligations of the firms necessary to establish and manage the alliance, and includes execution of customized and traditional transaction documents required by the alliance including agreements for subcontracting, reselling, joint development, and associated statements of work.

Equity relationships 32 are created and executed in accordance with a firm's investment procedures, to ensure shareholder value to the firm. In an equity relationship, the firm has an ownership, e.g., shareholder position. An equity relationship may also take the form of a joint venture, merger, or acquisition. An equity investment directly and immediately impacts the earnings of a firm. Typically, more restrictive due diligence and management processes are employed.

Business relationship taxonomy 30 may also have sub classifications as shown in FIG. 2. For example, alliances can be sub-classified into premier alliances, managed alliances, and alliances. These are distinguished by factors including annual revenue, global versus local geography driven, number or timeframe of successful engagements required, nature and type of business plan, funding terms, and press release activity.

Certain supplier, influencer, and channel relationships may also be referred to as emerging relationships 42. These have potential to become alliances or equity relationships. In cases where a third party relationship has not yet developed sufficiently to fall into one of the five relationship types described above, but where there is potential for forming a relationship, the third party may be classified as an emerging strategic relationship (not shown). Mere reseller 44 relationships are an additional sub-classification for channel 36, influencer 38, or supplier 40 relationship types.

The business relationship taxonomy 30 such as that shown in FIG. 2 and described above is a classification system defining relationship types based on their characteristics, attributes, and obligations. Those skilled in the art will recognize that modifications can be made in the above characteristics, attributes, and obligations without departing from the present invention. The taxonomy may be stored in a software or database tool including the database tool referred to above.

Returning to FIG. 1, in step 16 an opportunity in the relationship request is identified and quantified. Detailed information about the opportunity is collected and research is performed against data sources internal to the firm receiving the request as well as publicly available data sources such as 10K filings with the US Securities and Exchange Commission. The strengths and weaknesses of the opportunity are evaluated against various criteria established by the firm receiving the request. Preliminary discussions may be conducted with the requesting firm. Potential solution offerings proposed for the alliance or other relationship may be prototyped. The purpose of prototyping may include aid in discerning success probabilities or to assist in defining criteria for formation of an alliance or other strategic relationship with the second firm. A business case is prepared and evaluated in step 16.

If the quantification in step 16 is positive, then an alliance or other relationship is formed in step 18 including negotiating an alliance or other relationship contract between the requesting and receiving firms. If an agreement is reached, the business case is revised and validated. An alliance or other relationship executive hereinafter known as an alliance executive is assigned by the receiving firm to manage the alliance. The alliance executive oversees any changes in the terms and conditions set forth in the contract. The alliance executive develops a business plan and a management plan to implement the contract.

The business plan may specify rules of engagement, delivery support, offering and brand management, geography coordination plans, financial support and dissolution procedures. It may also specify use of a relationship health scorecard. The management plan may include business and marketing development, service delivery, procurement, and training. The management plan may also include a dissolution plan for transitioning the relationship to another relationship type.

Eventually, one or both of the alliance or other strategic relationship firms will request to dissolve the relationship. In step 22, the alliance or other relationship is therefore terminated. For example, the alliance may have reached the end of its lifecycle, or the contract may have expired, or one or both firms elect not to renew, or there is a need to restructure the alliance.

In step 24, the relationship is evaluated using the criteria in the taxonomy to determine if the relationship being terminated in step 24 maps against the taxonomy definition for another relationship type. If so, the opportunity is transitioned into this new relationship type. Otherwise, the requesting firm is transitioned to normal customer support.

The steps of FIG. 1 may be performed using a system having an entry tool, a database tool, and various means for performing the steps of FIG. 1. The system may be implemented using a workstation, computer, laptop or other computing device.

The entry tool may include software for receiving a request for a third party relationship. The request may be received in any form known in the art including receiving an e-mail from a requesting firm, scanning a document received from the requesting firm, receiving a filled-in web page from the firm, or keyboard entry of data from a hard copy request received from a requesting firm. As noted above, the request may be self generated.

The system also includes a database tool in which taxonomy is stored. Any type of database known in the art may be used including a relational database or a hierarchical database. Those of ordinary skill in the art will recognize that one or another database type will have criteria advantages in a particular embodiment of the invention.

The system also includes software code for implementing steps 14, 16, 18, 20, 22, and 24 of FIG. 1. The software code may be any software known in the art including software capability included in the database tool described above, as well as commercially available stand alone code, or specially written code in any known computer programming language. The code will by necessity interact with the alliance taxonomy data stored in the database when performing certain of the steps of FIG. 1, particularly steps 14 and 24.

While there have been shown and described what are at present considered the preferred embodiments of the invention, it will be obvious to those skilled in the art that various changes and modifications may be made therein without departing from the scope of the invention as defined by the appended claims. For example, a firm can be engaged in more than one relationship at a time.

What is claimed is:

1. A system comprising a network I/O, a CPU, and one or more databases for implementing a method of managing an alliance business relationship, said method comprising the steps of:
  receiving a request for a third party relationship;
  determining whether said relationship is an alliance using criteria in an alliance taxonomy stored in one of said databases;
  identifying and quantifying an opportunity in said relationship request including evaluating the strengths and weaknesses of said opportunity;
  preparing and evaluating a business case for said opportunity;
  forming said alliance including negotiating an alliance relationship contract;
  executing said alliance;
  terminating said alliance; and
  evaluating said alliance against criteria in said alliance taxonomy.

2. The system of claim 1, wherein said third party is a business providing services.

3. The system of claim 2, wherein said services comprise information technology services, human resources services, business transformation outsourcing services, or customer relationship management services.

4. The system of claim 1, wherein said taxonomy is a classification system defining relationship types based on characteristics, attributes, and obligations.

5. The system of claim 4, wherein said taxonomy defines the manner in which said relationship types align with each other.

6. The system of claim 4, wherein said relationship types comprise supplier, influencer, channel, alliance, and equity relationship types.

7. The system of claim 4, wherein said evaluating includes determining whether said third party relationship is a candidate for another of said relationship types.

8. The system of claim 1, wherein said identifying and quantifying includes conducting preliminary discussions with said third party.

9. The system of claim 1, wherein said identifying and quantifying includes prototyping potential solution offerings proposed for said alliance.

10. The system of claim 1, wherein said forming includes developing a business plan with said third party to implement said alliance relationship contract.

11. The system of claim 10, wherein said executing step further comprises executing in accordance with said alliance relationship contract and managing through said business plan.

12. A system comprising a network I/O, a CPU, and one or more databases, for implementing a method of managing a strategic business relationship, said method comprising the steps of:
- entering a request for a relationship;
- determining the relationship type using a criteria in a relationship taxonomy stored in one of said databases;
- identifying and quantifying an opportunity in said relationship request including evaluating the strengths and weaknesses of said opportunity;
- preparing and evaluating a business case for said opportunity;
- forming said relationship type including negotiating a relationship contract;
- executing said relationship type;
- terminating said relationship type; and
- evaluating said relationship type against criteria in said taxonomy.

13. An alliance managing system, comprising:
- a database having a request for a third party relationship;
- said database including software code for determining whether said relationship is an alliance using criteria in an alliance taxonomy stored in said database;
- software capability included in said database for identifying and quantifying an opportunity in said relationship request including evaluating the strengths and weaknesses of said opportunity;
- software capability included in said database for preparing and evaluating a business case for said opportunity;
- software capability included in said database for forming said alliance including negotiating an alliance relationship contract, and for tracking said forming and negotiating in said database;
- software capability included in said database for executing said alliance;
- software capability included in said database for terminating said alliance; and
- software capability included in said database for evaluating within said database, said alliance against criteria in said alliance taxonomy.

14. The system of claim 13, wherein said third party is a business providing services.

15. The system of claim 13, wherein said taxonomy is a classification system defining relationship types based on characteristics, attributes, and obligations.

16. The system of claim 15, wherein said relationship types comprise supplier, influencer, channel, alliance, and equity relationship types.

17. The system of claim 13, wherein said software capability included in said database for identifying and quantifying includes software capability included in said database for prototyping potential solution offerings proposed for said alliance.

18. A computer program product for instructing a processor to manage an alliance business relationship, said computer program product comprising:
- a computer readable medium;
- first program instruction means for receiving a request for a third party relationship;
- second program instruction means for determining whether said relationship is an alliance using criteria in an alliance taxonomy;
- third program instruction means for identifying and quantifying an opportunity in said relationship request including evaluating the strengths and weaknesses of said opportunity;
- fourth program instruction means for preparing and evaluating a business case for said opportunity;
- fifth program instruction means for recording the forming of said alliance including negotiating an alliance relationship contract;
- sixth program instruction means for tracking the executing of said alliance;
- seventh program instruction means for tracking the terminating of said alliance; and
- eighth program instruction means for evaluating said alliance against criteria in said alliance taxonomy; and wherein
- all said program instruction means are recorded on said medium.

* * * * *